(12) United States Patent
Brebner et al.

(10) Patent No.: US 10,572,249 B2
(45) Date of Patent: Feb. 25, 2020

(54) SOFTWARE KIT RELEASE MANAGEMENT (71) Applicant: Hewlett Packard Enterprise Development LP, Houston, TX (US)

(72) Inventors: Gavin Brebner, St. Martin d'Uriage (FR); Christopher James Grandinetti, Lavallette, NJ (US); Andrea Frittoli, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/770,370

(22) PCT Filed: Oct. 30, 2015

(86) PCT No.: PCT/US2015/058240
§ 371 (c)(1),
(2) Date: Apr. 23, 2018

(87) PCT Pub. No.: WO2017/074414
PCT Pub. Date: May 4, 2017

(65) Prior Publication Data
US 2018/0253296 A1 Sep. 6, 2018

(51) Int. Cl.
G06F 8/71 (2018.01)
G06F 8/20 (2018.01)
(Continued)

(52) U.S. Cl.
CPC .............. G06F 8/71 (2013.01); G06F 8/20 (2013.01); G06F 8/73 (2013.01); G06F 11/3688 (2013.01)

(58) Field of Classification Search
CPC ... G06F 15/16; G06F 8/71; G06F 8/20; G06F 11/36; G06F 11/3688; G06F 8/73
See application file for complete search history.

(56) References Cited

U.S. PATENT DOCUMENTS 6,336,217 B1    1/2002  D'Anjou et al.
7,069,541 B2    6/2006  Dougherty et al.
(Continued)

FOREIGN PATENT DOCUMENTS

IN    3672/MUM/2011    5/2013

OTHER PUBLICATIONS

Serena, "Release Management: Closing the Gap in Application Lifecycle Management," (Research Paper), Aug. 2010, 6 pages.
(Continued)

Primary Examiner — Wei Y Zhen
Assistant Examiner — Amir Soltanzadeh
(74) Attorney, Agent, or Firm — Hewlett Packard Enterprise Patent Department (57) ABSTRACT A software kit release managing program is provided. Upon execution of the program by a processor a manifest file corresponding to a build version of the software kit is generated and the manifest file is added to a code repository of a collaborative code development program. Progression of the build version of the software kit through a code testing pipeline having a plurality of pipeline stages is performed using the collaborative code development program. A corresponding method, apparatus and a system comprising the software kit release managing program and the collaborative code development program are also provided.

17 Claims, 8 Drawing Sheets (51) Int. Cl.
*G06F 8/73* (2018.01)
*G06F 11/36* (2006.01)

(56) References Cited

U.S. PATENT DOCUMENTS

| | | | |
|---|---|---|---|
| 8,670,604 | B2 | 3/2014 | Eggert et al. |
| 8,677,315 | B1 | 3/2014 | Anderson et al. |
| 2003/0182652 | A1 | 9/2003 | Custodio |
| 2009/0187823 | A1 | 7/2009 | Farrell et al. |
| 2013/0227573 | A1 | 8/2013 | Morsi et al. |
| 2013/0232470 | A1* | 9/2013 | Yung .................. G06F 8/40 717/121 |
| 2013/0332916 | A1 | 12/2013 | Chinn et al. |
| 2014/0189641 | A1* | 7/2014 | Anderson ............ G06F 8/60 717/110 |
| 2015/0248280 | A1 | 9/2015 | Pillay et al. |

OTHER PUBLICATIONS

Openstack, "openstack-infra/subunit2sql: Tooling for converting subunit streams into a SQL DB", available online at <http://git.openstack.org/cgit/openstack-infra/subunit2sql/>, retrieved on Nov. 16, 2018, 2 pages.

Monorail, "Project"Gerrit, available online at <https://bugs.chromium.org/p/gerrit/issues/list>, retrieved on Nov. 16, 2018, 6 pages.

International Search Report and Written Opinion received for PCT Patent Application No. PCT/US2015/058240, dated Jul. 25, 2016, 11 pages.

International Preliminary Report on Patentability received for PCT Patent Application No. PCT/US2015/058240, dated May 11, 2018, 10 pages.

Frittoli, Andrea, "Test Repository: A persistent repository of test runs and test results", available online at <https://blueprints.launchpad.net/tempest/+spec/test-repository>, Jun. 11, 2014, 2 pages.

* cited by examiner

RELEASE PIPELINE TRACKING MANIFEST FILE

```
{
  "qa_rt_metadata_version": 3,
  "build_tag": "hp-ee-stable-1.0-1425078059",
  "build_details": {
    "upstream_job_name": "periodic-ee-on-Opsys-hp-ee-stable-1.0",
    "upstream_build_location": "cdl",
    "upstream_build_url":
"https://ftctjob_run01g.fc.usa.hp.com/job/periodic-ee-on-Opsys-hp-ee-stable-1.0/938
/",
    "upstream_build_number": "938"
  },
  "artefacts": {
    "metadata":
    "binaries":
"http://tarballs.server.pcloud.net/ee-installer/hp-ee-stable-1.0-1425078059",
"http://tarballs.server.hpcloud.net/ee-installer/hp-ee-stable-1.0-1425078059/ce_insta
ller.tgz"
  },
  "qa_readout": {
    "kit_quality": "{(kit_quality)}",
    "qa_readout_details": "{(qa_readout_details)}"
  },
  "notes": "{(notes)}"
}
```

```
build_metadata_v3.template
{
    "qa_rt_metadata_version": 3,
    "build_tag": "{{build_tag}}",
    "build_details": {
        "upstream_job_name": "{{upstream_job_name}}",
        "upstream_build_location": "{{upstream_build_location}}",
        "upstream_build_url": "{{upstream_build_url}}",
        "upstream_build_number": "{{upstream_build_number}}"
    },
    "artefacts": {
        "metadata": "{{artefacts_metadata}}",
        "binaries": "{{artefacts_binaries}}"
    },
    "qa_readout": {
        "kit_quality": "{{kit_quality}}",
        "qa_readout_details": "{{qa_readout_details}}"
    },
    "notes": "{{notes}}"
}
```

FIG 8

SOFTWARE KIT RELEASE MANAGEMENT

BACKGROUND

Development of application programs is a complex process and the speed and efficiency of deployment of production versions of new software kits can be a concern to the business. Thus there is a continual pressure to speed up software release cycles with the number of releases in a given period tending to increase as time progresses. Furthermore software kits themselves are becoming more complex with requirements to deploy them in production environments including distributed network systems such as cloud computing systems. Prior to release, software kits may have to be tested on deployment environments representing these different production environments. Software developers may be faced with short timescales of just weeks to implement multiple software kits. Software testing pipelines for a build version of a software kit may involve detailed tracking and manual documentation of results of multiple testing stages. Modifications to software kits can range from changes to a single code component of a software kit to completely new software kits.

Certain parts of the software kit development process can be readily automated, for example, updates made by software developers to code components of the software kit may be coordinated by a collaborative code development program having a code repository that may be commonly accessed by a team of developers. A process known as continuous integration can be used to rapidly test and report on changes to source code components of a software kit soon after they are added to the code repository. However, a release management stage of the software development process, which follows on from successfully building a software kit from its code components, involves testing the build version in a deployment environment and this can represent a bottleneck in the overall development process due to the involvement in the release approval process of quality assurance input from multiple different people including software developers, engineers and managers. The release stage of the software development process may rely upon laborious checklists and time-consuming manual gathering of documentation of release criteria associated with the software kit deployment testing.

BRIEF INTRODUCTION OF THE DRAWINGS

Example embodiments are further described hereinafter with reference to the accompanying drawings, in which.

DETAILED DESCRIPTION

Figure 1:
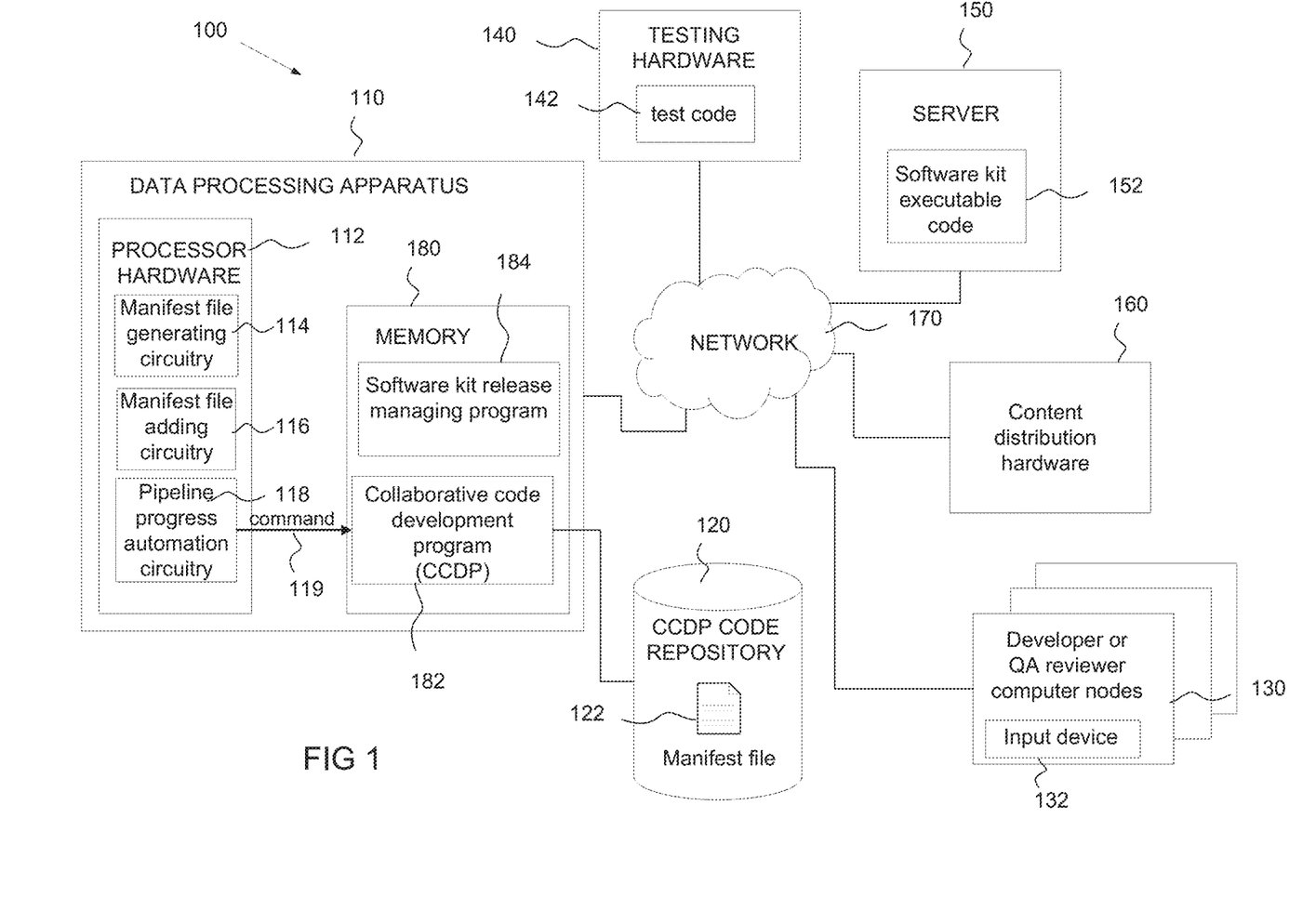
FIG. 1 is an example computer network system implementing a software kit release managing programme of the present disclosure.

FIG. 1 is an example computer network system including processor hardware to implement the software kit release managing program of the present disclosure. A software kit is a set of machine-readable program instructions that may comprise a number of different constituent code components such as source code components, object code components, interpreted code components, header files and libraries. The system 100 comprises a data processing apparatus 110, a code repository 120, a plurality of developer or QA reviewer computer nodes 130, testing hardware 140, a server 150, content distribution hardware 160 and a communication network 170.

The data processing apparatus 110 has processor hardware 112 comprising manifest file generating circuitry 114, manifest file adding circuitry 116 and pipeline progress automation circuitry 118. The manifest file generating circuitry 114 generates a manifest file 122 characteristic of a build version of a software kit and the manifest file adding circuitry 116 adds the manifest file to the code repository 120 corresponding to a Collaborative Code Development Program (CCDP) 182. The circuitry in these modules 112, 114, 116, 118 may be general purpose processing circuitry configured by program instructions or may be configured at least in part by modification to the processing hardware to perform the specified functions. An executable version of the CCDP 182 in this example is stored in a memory 180 of the data processing apparatus 110. A manifest file 122 may be used to list the contents of a software kit such as constituent code components in object code or in executable form, may comprise metadata describing the code components or relationships between the code components, information with regard to whether or not the particular software kit has been approved, whether or not testing has been successful and data allowing a number of different versions of the same software kit to be compared in terms of testing and approval results. The manifest file 122 is a data file and may be written in a markup language such as XML (extensible markup language) or another machine-readable structured format. The manifest file 122 may be generated using a scripting language or using an object-oriented programming language. The CCDP 182 could be an online or web-based collaborative code development tool.

The memory 180 also stores executable code corresponding to a software kit release managing program 184 having code for configuring the processor hardware 112 to perform functions associated with progress of a software kit build version through a plurality of stages of a testing pipeline. The pipeline progress automation circuitry 118 may generate a command 119, which is a program instruction characteristic to the CCDP 182, and may use the command 119 to control the CCDP 182 to advance progress of a workflow of the testing pipeline. The command 119 is a command corresponding to a command-line interface of the CCDP 182. A command line interface may provide a way for a user or client to interact with a computer program such as the CCDP 182 in the form of successive lines of text that may be referred to as command lines. Command-line interfaces can provide a more precise and powerful way of controlling a computer program or an operating system than use of a graphical user interface. The CCDP 182 may provide a command line interface supporting input of parameters, input text-based commands and input operating-system inter-process communication. The command 119 is a text-based command for causing transitions in a workflow status of a pipeline within the CCDP 119. One non-limiting example of a command that could be used as the command 119 is a change request command for causing a change in a workflow status of the CCDP 182. The command 119 could represent a command line input or a function or a machine readable program instruction or a series of machine-readable program instructions or a script. For example, the command 119 may be used to cause a transition between two successive stages of the testing pipeline or to initiate loading of executable code of a build version of a software kit into the code repository 120 or onto a testing hardware platform 140. The CCDP 182 may control running of stages of the testing pipeline and the automation of progression through and between pipeline stages may be performed via interaction of the software kit release program 184 with the CCDP 182.

Generation of the manifest file 122 by the circuitry 114 for storage in the code repository and issuance of the CCDP command 119 by the pipeline progress automation circuitry 118 can facilitate automation of the release testing pipeline.

Different stages of the testing pipeline may involve different levels of human input, such as input from developers, quality assurance engineers and quality assurance managers and the different stages may involve different levels of implementation on hardware of the computer network system 100 such as server clusters. Developers or quality assurance reviewers may provide input to the CCDP 182 via respective computer nodes 130 using a computer input device 132. The computer nodes 130 may be, for example, a desktop computer, a laptop, a personal digital assistant or a mobile telephone. The input device may be for example, a keyboard, a touchscreen or a voice-based input interface allowing the user to input quality assurance information to the CCDP 182. The information may have a predetermined input format that could be presented via a graphical user interface on the computer nodes 130, the input format can be prescribed by a template in the manifest file 122. Different testing pipeline stages may have different deployment environments on the testing hardware platform 140 that may partially simulate a production environment. A quality assurance reviewer or engineer may provide input to the CCDP 182 via an input interface. The deployment environment may comprise a single hardware processing node or a cluster of different hardware processing nodes, perhaps geographically distributed.

Tests of the testing pipeline may comprise emulation of a processor in the deployment environment and could employ a virtual machine and may also use a virtual machine monitor.

In some examples successive stages of the software kit testing pipeline involve progressively more accurate representations of the hardware production environment and require progressively more quality assurance input from human beings. The complexity of the software kit release management process involving many different people and the testing and evaluation of multiple different build versions of a software kit can make it difficult to automate and thus there is a tendency to manually gather documentation relating to release criteria and check-points. Although the information relating to release criteria could be stored in a series of databases, keeping track of information generated for different software kits and different build versions and managing timely storage of that information in one or more databases can be resource intensive on both the server side when attempting to store the information and on the client side when attempting to retrieve the information. Use of the CCDP command 119 and use of the manifest file 122 to control the release testing pipeline system can often be less resource intensive. Re-purposing of the CCDP via the software kit release managing program to perform software kit release management as well as software code development is convenient for quality assurance engineers and programmers who are likely to already be familiar with the CCDP commands and requests in the context of the code development function. This provides a more convenient automation of the software kit release management than might be achievable using a set of databases.

As illustrated in FIG. 1, the testing hardware 140 and testing code 142 for the testing pipeline may be in a different network location from the data processing apparatus 110 where the CCDP 182 and the software kit release managing program 184 is stored.

However, the tests may be triggered by the software kit release manager program 184 and the code repository 120 may be updated with test results under control of the software kit release manager program 184. The test results may be appended to the manifest file 122 and could be stored in a location in the code repository 120 depending upon a build tag associated with the software kit build version included in the manifest file 122. Executable code 152 for a build version of a software kit may be stored on the server 150 and the manifest file 122 may include a pointer to the memory location in the server 150 of the executable code for the given build version. The CCDP command 119 may result in automatic deployment of the software kit executable code 142 on the testing hardware 140 and results of the tests may be collated by the software kit release managing program 184 and stored to the CCDP code repository 120 or may be published on a graphical user interface (GUI) for display on the computer nodes 130. Upon completion of the testing pipeline and approval of a given build version of a software kit for release, the software kit release manager program 184 may in some example systems initiate upload of the approved build version to the content distribution hardware 160 ready for release.

Figure 2:
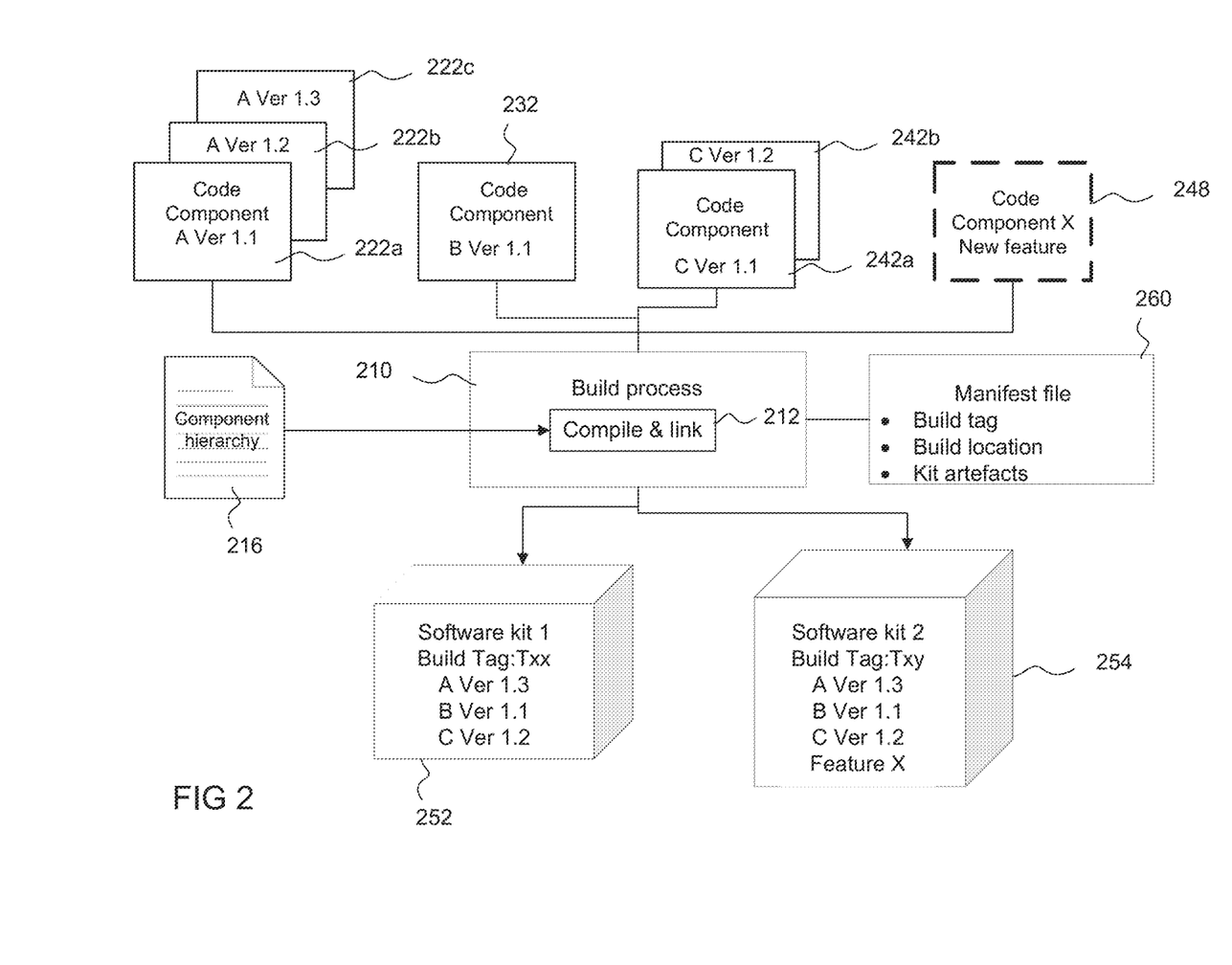
FIG. 2 is an example schematically illustrating generation of the software kit from a plurality of code components and generation of a corresponding manifest file.

FIG. 2 is an example schematically illustrating how a software kit comprising machine readable instructions is generated from a plurality of code components and how a manifest file is generated for a build version of the software kit. A build process 210 takes as inputs: a code component A, 222a; a code component B, 232; and a code component C, 242a. A further code component X, 248, comprises program instructions for a new feature not present in an initial build of the software kit.

In FIG. 2 it can be seen that the code component A has a first version 222a, a second version 222b and third version 222c. Similarly, the code component C has a first version 242a and a second version 242b. The code components can be source code components such as program instructions of an object-oriented programming language that is compiled into object code and then linked to generate binary code for execution by a processor. Code components could comprise interpreted code that need not be compiled prior to execution and the interpreted code may be executed on a virtual machine or an emulated processor. Other non-limiting examples of code components include header files and library files. Examples of interpreted code include Perl and Python.

The three different versions 222a, 222b, 222c of the code component A in the example of FIG. 2 may result from successive bug-fixes or as a result of a new functionality being added to the code component A between successive build versions of a first software kit 252 or a second software kit 254 including that component. The different source code components 222a-c, 232, 242a-b, 248 may have been independently developed by different programmers and may be subject to review and testing by a programmer or quality assurance engineer other than the originating author before being approved for forwarding to a build process 210. Different software kits 252, 254 may be generated from different combinations of the plurality of code components 222a-c, 232, 242a-b, 248 selected from the full set of available code components available. The code components 222a-c, 232, 242a-b, 248 may be stored on the same computer hardware in a single geographical location or on different computers (physical hardware) in the same or in different geographical locations. For example different ones of the code components 222a-c, 232, 242a-b, 248 may be stored on different hardware nodes of a local computer network or on different nodes of a distributed computer network such as a cloud computing system.

In the example arrangement of FIG. 2, the first software kit 252 comprises: the code component A version 1.3, 222c: code component B version 1.1, 232; and code component C version 1.2, 242b. Meanwhile, the second software kit 254 comprises: code component A version 1.3, 222c; code component B version 1.1, 232; code component C version 1.2, 242b; and the code component X 248 associated with the new feature.

As shown in FIG. 2, the build process 210 includes a compile and link function 212 that may utilize a component hierarchy data set 216 such as one or more "makefiles". Makefiles are text files written in a particular syntax that allow a software kit to be constructed from its constituent source files, effectively providing recipe for organizing the code components, performing any compilation of source code to object code and the linking object code of the code components. For example, in a programming language such as C/C++, when an individual source code component is changed it can be recompiled and if an associated header file is changed then any C/C++ source code component that includes that header file can also be recompiled so that the newly-introduced changes carry through to all the relevant code components of the software kit. As a result of the compilation process any code components including source code are compiled to form object code and the object code is linked to generate binary code that is more readily executable by a processor.

The build process 210 according to the present disclosure generates a manifest file 260 corresponding to a given build version of a given software kit 252, 254. The manifest file 260 of this example includes: (i) a build tag to identify the build version of the software kit; (ii) a build location specifying a server location where binary code corresponding to the build version is stored; and (iii) artefacts corresponding to the software kit such as pointers to source code, object code or executable code for the code components and metadata corresponding to the software kit.

If an individual one of the code components 222a-c, 232, 242a-b, 248 included in a software kit 252, 254 has been changed, e.g. debugged or updated, since a previous build was performed, then it can be re-compiled, where applicable, without having to re-compile any of the other code components that remain unchanged since the previous build. It will be appreciated that at least some of the code components may be written in an interpreted programming language such as Python, which may mean that compilation is not needed.

However, due to recompilation of a changed code component, linking of all of the object files of the constituent code components of the respective software kit can be performed to produce a new build version of the respective software kit. If simply a subset of the code components of a given one of the software kits 252, 254 have been modified then the remaining subset of unmodified code components of that kit need not be recompiled, just re-linked. Any changed code components corresponding to an interpreted language may be incorporated in a new build version of a software kit simply by re-linking, without compilation of the code component being performed.

For a given software kit, there may be a plurality of different build versions generated as a software release cycle progresses, corresponding to different change requests to the individual code components by quality assurance engineers and managers. Keeping track of testing data and release notes for these multiple build versions for multiple software kits can be challenging. Some selected software kits may be tested and this depends upon communication between engineering managers and quality assurance release managers.

If a quality assurance release manager approves a change to a software kit build version then it can be installed on the testing hardware 140 of FIG. 1 for testing.

Figure 3:
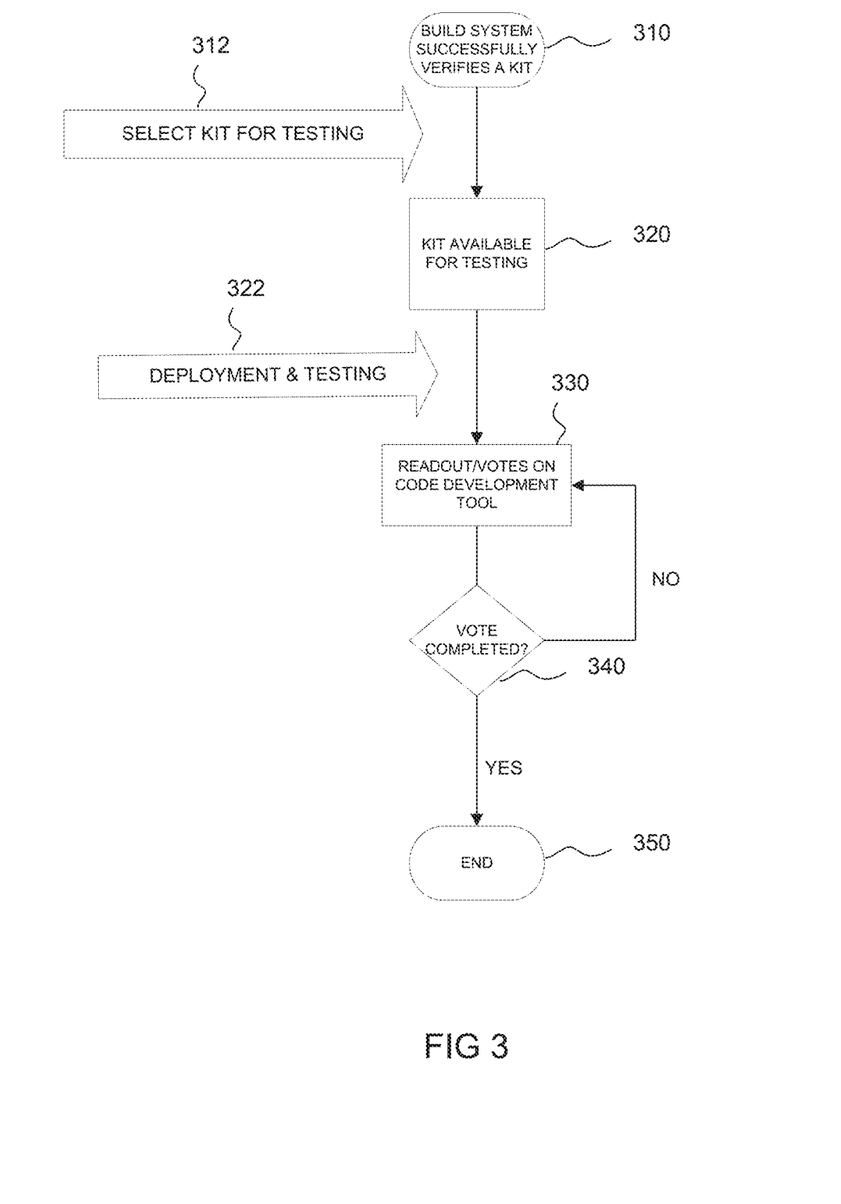
FIG. 3 is an example flowchart for a quality assurance release workflow for a software kit.

FIG. 3 is an example flow chart for a quality assurance release workflow for a software kit. One purpose of the software kit release process according to the present technique is to track a build version of a software kit that a quality assurance evaluation team receive from the software kit development process all of the way through a quality assurance installation and testing process and to archive metadata corresponding to the build version into an appropriate area of the CCDP repository 120. The metadata can be representative of test results and quality assurance decisions. At block 310 of the flow chart of FIG. 3, the build system 210 of the CCDP 182 successfully verifies a software kit, which is then subject to review by a quality assurance engineer to accept or reject changes to the kit for subsequent testing and potential deployment on testing hardware. In this example, the quality assurance engineer provides input to the CCDP 182 of the example of FIG. 1 via the input device 132. This input is illustrated as arrow 312 in the FIG. 3 example, which comprises selecting the software kit for testing. The CCDP 182 then advances the workflow to make the software kit available for testing at block 320. The manifest file 122 corresponding to the particular build version of the software kit may be used to establish a location of the build executable code 152 in the server 150 and to enable a Quality Assurance engineer to deploy the executable code 152 on the testing hardware 140 using the test code 142 appropriate to the first stage of the testing pipeline. The deployment and testing is indicated by the arrow 322 in the FIG. 3 example flowchart. The information stored in the manifest file 122 may be stored for later use, allowing technical details to be accessed in response to customer queries relating, for example, to previous release versions. This may allow bugs to be fixed and issues to be resolved in "legacy systems".

At block 330, results of the tests are collated and votes on whether or not the build version should be accepted, depending upon review of the test data by quality assurance engineers, are gathered by the software kit release managing program 184. While the testing is in progress, a quality assurance release manager may utilize the software kit release managing program 184 to execute a script, comprising interpreted machine readable program instructions, that automatically generates a CCDP 182 review event or sequence of events specific to the current build version and software kit. The review event(s) may result in generation of quality assurance team members names that may need to provide review input via the input device 132 and a proposed successful readout for the review process. The quality assurance feedback templates and reviewer lists can be defined by templates provided in the manifest file 122 and generated by the manifest file generating circuitry 114 of the data processing apparatus 110, under control of the software kit release managing program 184. In the FIG. 3 example, at block 340 if all of the reviewer votes have been completed and the test feedback has been collated then the workflow ends at block 350. However, if it is established at block 340 that the reviewer votes are not yet complete then the software kit release managing program 184 continues to collate results and readout, using the build tag of the relevant manifest file 122 to correlate the testing and review output with the build version of the software kit currently being tested. Thus the build tag may be used in the kit metadata stored in the code repository and may be used in a test results database when reporting the test results. The build tag may also be used in a bug tracking system when reporting bugs in the source code corresponding to the software kit. The build tag allows data to be automatically collected for each software kit that flows through the software kit release management system even when the data is stored in external systems such as a test result database and a bug tracking system.

Figure 4:
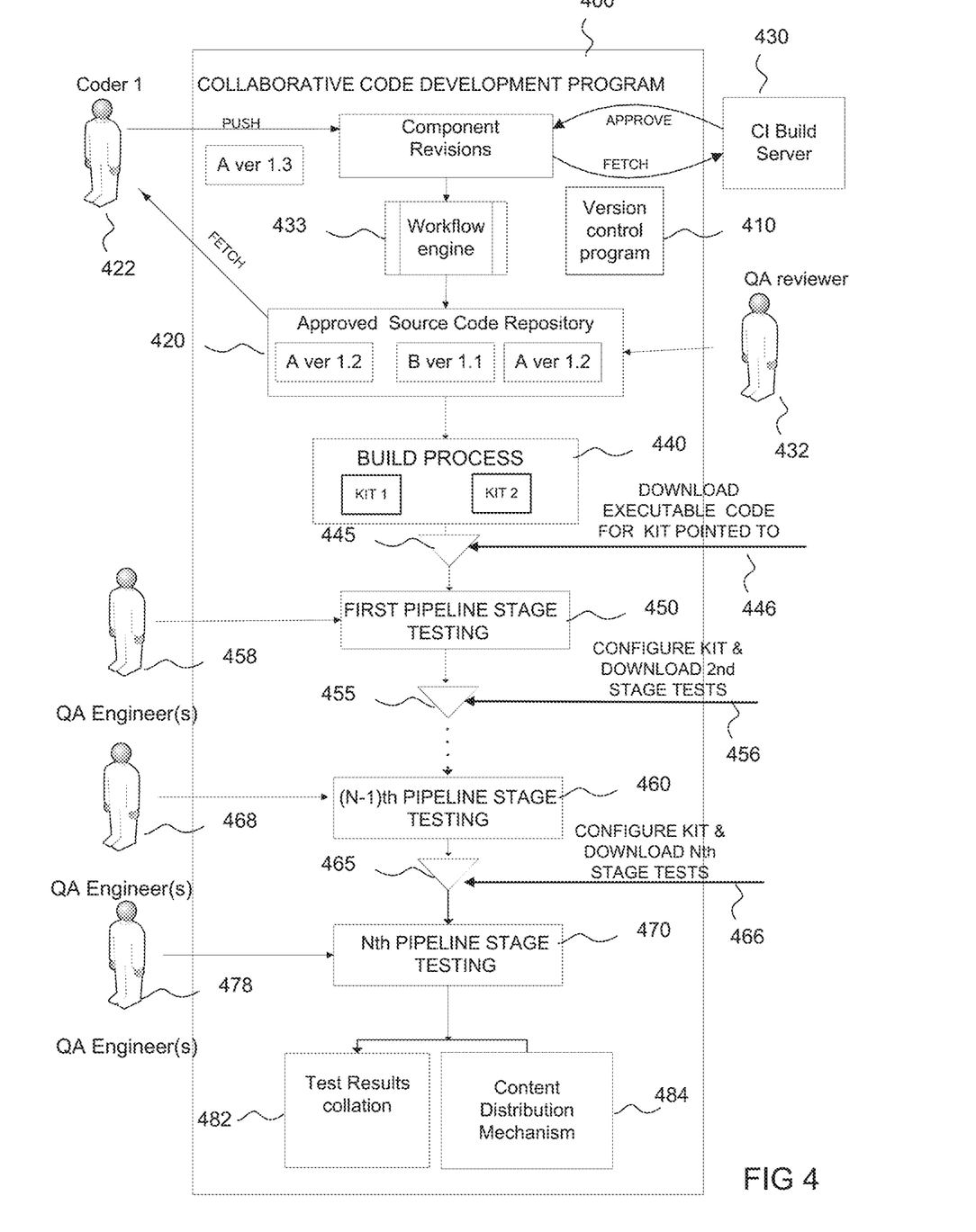
FIG. 4 is an example collaborative code development programme workflow schematically illustrating automated gating tests implemented using the software kit release managing program.

FIG. 4 is an example collaborative code development program workflow schematically illustrating automated gating tests implemented using the software kit release managing program 184 according to the present technique. A collaborative code development program 400 in this example is a web-based code collaboration program allowing a team of software developers to contribute code components to a software kit and to modify the code components. A version control program 410 is used to keep track of code components and their revisions by assigning them version numbers when they are checked into an approved source code repository 420. When one developer checks out a particular version of a code component it may then be locked by the version control program 410 so that concurrent changes to the code being made by a different developer can be prevented. The approved source code repository 420 and the web-based interface allow developers to review each other's modifications to code components using a web browser and to approve or reject those changes.

In the FIG. 4 example it can be seen that the approved source code repository is currently storing code component A version 1.2, code component B version 1.1 and code component C version 1.2. A coder 422 may fetch the code component A version 1.2 from the approved code repository 420, checking it out to lock it. After modifying the code component A version 1.2, for example to correct a bug, the coder 422 pushes the modified code component A back into the collaborative code development program 400, where it is assigned an new version number by the version control program 410, becoming code component A version 1.3. Once checked back into the approved source code repository 420, it becomes accessible to other members of the software team for review and editing.

A continuous integration build server 430 may be used to check that the newly submitted code component A version 1.3 integrates properly when compiled and linked with other software components of a software kit with which it is associated prior to approving the new code component A version 1.3 for storage in the approved source code repository 420. A human quality assurance reviewer 432 may provide feedback relating to any new versions of code components via the web-based interface and approval of the new version can depend on these review results. Rebuilding of a software kit by the continuous integration build server 430 using the most up to date versions of all of the code components may be performed periodically or each time there is a change to any of the constituent code components. A workflow engine 433 is provided to manage workflow of component revisions from submission through to approval for storage in the approved source code repository 420.

A build process 440 generates a first software kit 442 and a second software kit 444 by compiling, where appropriate, and linking sets of code components from the approved source code repository 420. A result of the build process 440 is executable code corresponding to a particular build version of the software kit appropriate for deployment on a given deployment platform comprising processing hardware. Executable code for the build version of the software kit may be stored in a different location from the approved source code repository 420, for example, on a remote server. Once a build version has been approved for testing by a quality assurance manager, the build version of the software kit can be passed through a testing pipeline using commands of the collaborative code development program 400 to automate passage through the system. The testing pipeline entered subsequent to the build process 440 comprises a first pipeline stage testing 450 and a plurality of subsequent pipeline stages of testing up to a total of N stages, where N is a non-zero integer. The FIG. 4 example shows this schematically by representing the first pipeline stage testing 450, the (N−1)th pipeline stage testing 460 and the Nth pipeline stage testing 470. The intervening pipeline stages, although present, are not shown in FIG. 4.

According to the present technique, progression of the software kit release process from generation of a build version of the software kit at block 440 through the testing pipeline stages 450, 460 and 470, i.e. pipeline stages 1 through to N, and through to release and distribution of a build version at block 484 may be managed using a software kit release managing program 182 to run script(s) and issue commands characteristic of the collaborative code development program 400, such as change request commands to control a series of gates 445, 455 and 465 between the stages. The gates 445, 455 and 465 may be implemented in software, in hardware of using a combination of hardware and software and may depend upon input from one or more of the quality assurance engineers 458, 468, 478. The software kit release managing program 184 controls a first gate 445 between the build process 440 and the first pipeline stage 450 to manage downloading of executable code for a build version of the software code pointed to by the manifest file 122 to testing hardware 140 for deployment in an environment appropriate to the first pipeline stage testing 450. The deployment environment may include the processing hardware and a given operating system or virtual machine(s). The software kit release managing program 184 also controls gates 455, 465 between successive pipeline testing stages, where a CCDP change request command is issued by the software kit release managing program 184 to open the gate subject to a previous test stage having been passed. Opening of the respective gate 455,465 results in downloading the test code for the relevant pipeline stage to the testing hardware 140 and configuring the test code and the build version so that it runs seamlessly to deploy the tests.

Once the build version has passed through the Nth pipeline stage 470 successfully, the software kit release managing program 184 may collate the final test results and the quality assurance feedback at block 482. This information is appended to the corresponding manifest file 122. When the software kit is deemed ready for release upon completion of the Nth pipeline stage 470 in the FIG. 4 example, it may be tagged for release and the software kit release managing program 184 can cause the software kit to be code signed, compressed encrypted or otherwise processed. The code signed software kit may then be uploaded to the content distribution mechanism 484 and made available to customers. Code signing may involve digitally signing executable code corresponding to the software kit to provide security when deploying the code by verifying the identity of the build system or author and providing a checksum to verify that the code object has not been modified. A cryptographic hash may be used for the code signing.

In addition to providing and controlling gates between testing pipeline stages, the software kit release managing program 184 triggers input of quality assurance data from a group of quality assurance reviewers based on review requirement template data stored in the manifest file 122. The review requirement template data may be, for example as a series of questions to be answered by a quality assurance reviewer via input to a graphical user interface. Control of the quality assurance review process may be performed by the software kit release managing program 184 generating a review command compatible with a command line interface of the CCDP 182. The review program instruction is automatically generated at an appropriate stage of the workflow depending upon the gating performed by the software kit release managing program 184. As shown in the example of FIG. 4, quality assurance engineers 458, 468, 478 can provide input to the testing process at pipeline testing stages 450, 460, 470 respectively.

Figure 5:
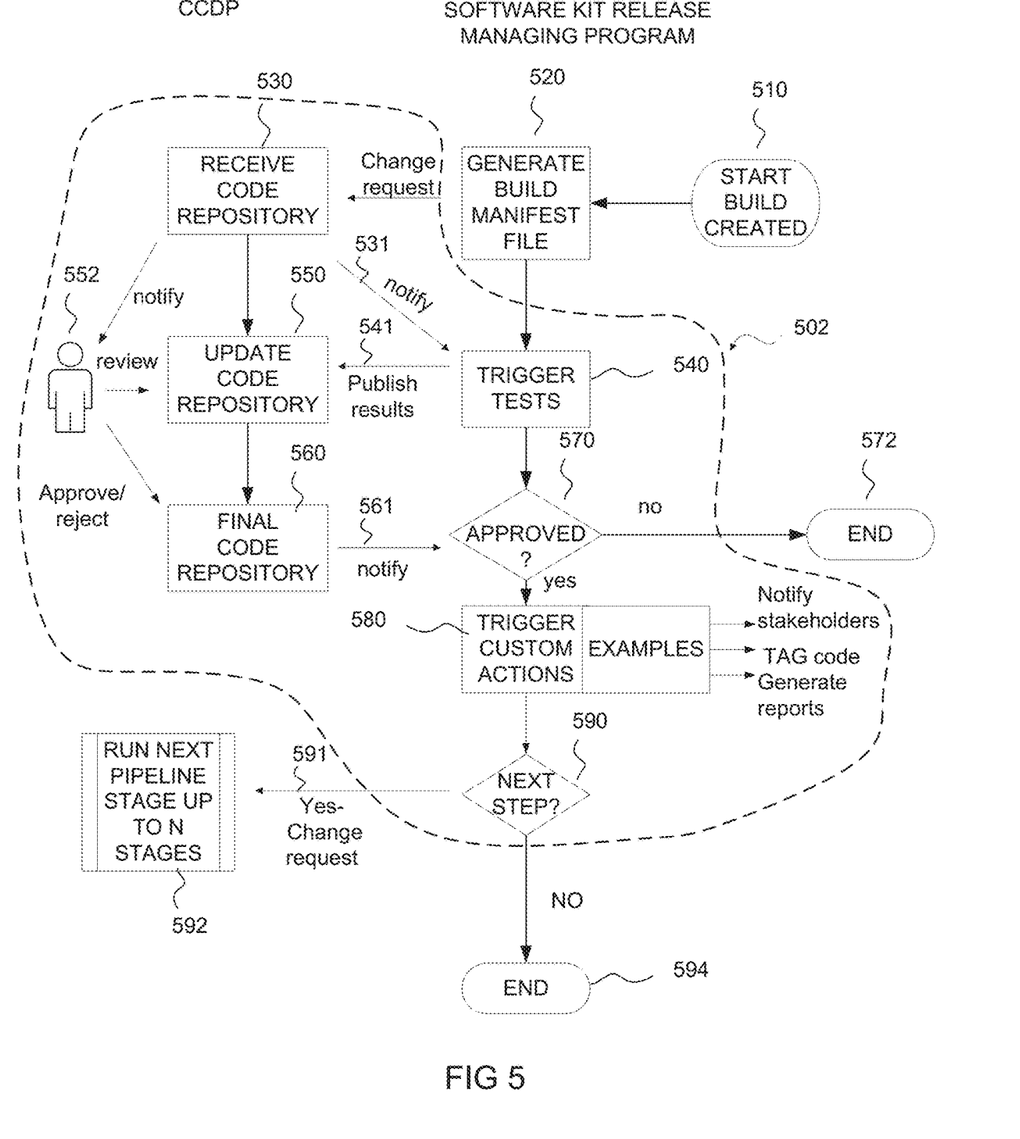
FIG. 5 is an example flowchart that schematically illustrates interaction between the collaborative code development programme and the software kit release manager program during an individual testing pipeline stage.

FIG. 5 is an example flow chart that schematically illustrates interaction between the CCDP 182 and the software kit release managing program 184 during an individual testing pipeline stage. The blocks on the right hand side of the FIG. 4 example represent actions performed by the software kit release managing program 184, whereas, the blocks on the left hand side of FIG. 4 represent the effects of those actions upon the collaborative code development program 182. A sequence of process blocks 502 represent a single pipeline stage and steps corresponding to the set of process blocks 502 may be performed for each pipeline stage. At block 510 the process starts when a new build of the software kit is created. The software kit release managing program 184 responds to notification that a new build has been created at block 520 by generating a manifest file 122. The manifest file may comprise a build tag and a pointer to a storage location where executable code of the build version is stored. At block 520, the software kit release managing program 184 outputs a change request to control the collaborative code development program to receive versions of code components corresponding to the build version in its code repository at block 530. The build version executable code is installed on separate testing hardware as shown in FIG. 1.

At block 530, the CCDP 182 notifies the software kit release managing program 184 via a notify event 531 that the build version executable is available for testing and the software kit release managing program 184 can trigger execution of the tests at block 540. The testing may include testing syntax of change requests passed into the CCDP. Triggering of tests on the software kit may be automated at least in part by the software release management program, and may request input from a QA engineer via a graphical user interface as part of the automated testing process. Also at block 540, the software kit release management program 184 causes the test results for the pipeline stage to be published in an appropriate storage region of the code repository of the CCDP 182 by sending an event 541 to the CCDP 182. At block 550, the CCDT updates the code repository based upon input to the CCDT by a quality assurance review engineer 552, who has been electronically notified when the code repository received the new build version code at block 530 and performs a review of the build version based upon the published test results at blocks 540 and 550. If the build version of the software kit has successfully passed tests of the given pipeline stage and is approved by the quality assurance engineer at block 550, then it is promoted to a final version for this pipeline testing stage in the code repository at block 560.

At block 560, the CCDP 182 sends a notification event 561 to the software kit release managing program 184, which receives the notification at block 570. If the build version is not approved at block 570 then the process proceeds to block 572 where testing of this build version is terminated and the workflow for this build ends. However, if at block 570, the software kit release managing program 184 receives notification via event 561 that the build version has been approved by the particular pipeline testing stage then the process proceeds to block 580 where the software kit release managing program 184 triggers custom actions in response to the build version approval notification output by block 560. The custom actions may be, for example, electronically notifying stakeholders, such as engineers and managers, electronically that the test pipeline stage has been passed by the build version of the software kit, tagging the source code corresponding to code components of the build version of the software code with test results and quality assurance feedback and generating reports relating to test outcomes and review comments for the given testing pipeline stage. The electronic notification may be performed, for example, by email, by text message or via a GUI on displays of the computer nodes 130. Once the custom actions have been triggered, the software kit release managing program 184 proceeds to block 590 where a change request command 591 is issued to initiate the CCDP to run the next pipeline stage at block 592. The next pipeline stage at block 502 repeats the set of blocks labeled 502, but with a set of tests and quality assurance review actions relevant to the next pipeline stage. Otherwise, if the end of the pipeline has been reached, the process ends at block 594

Figure 6:
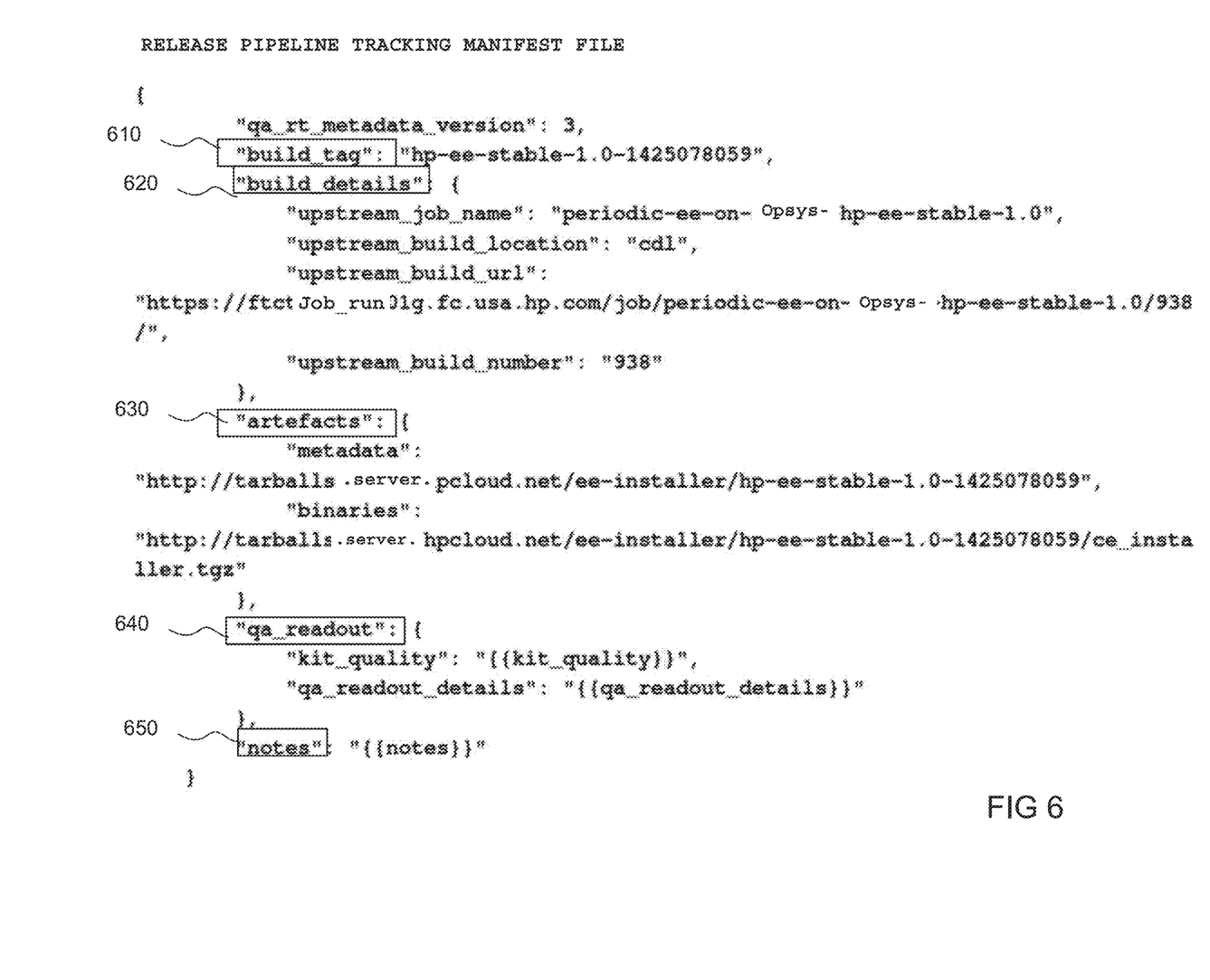
FIG. 6 is an example manifest file containing specific information about a software kit build version.
Figure 8:
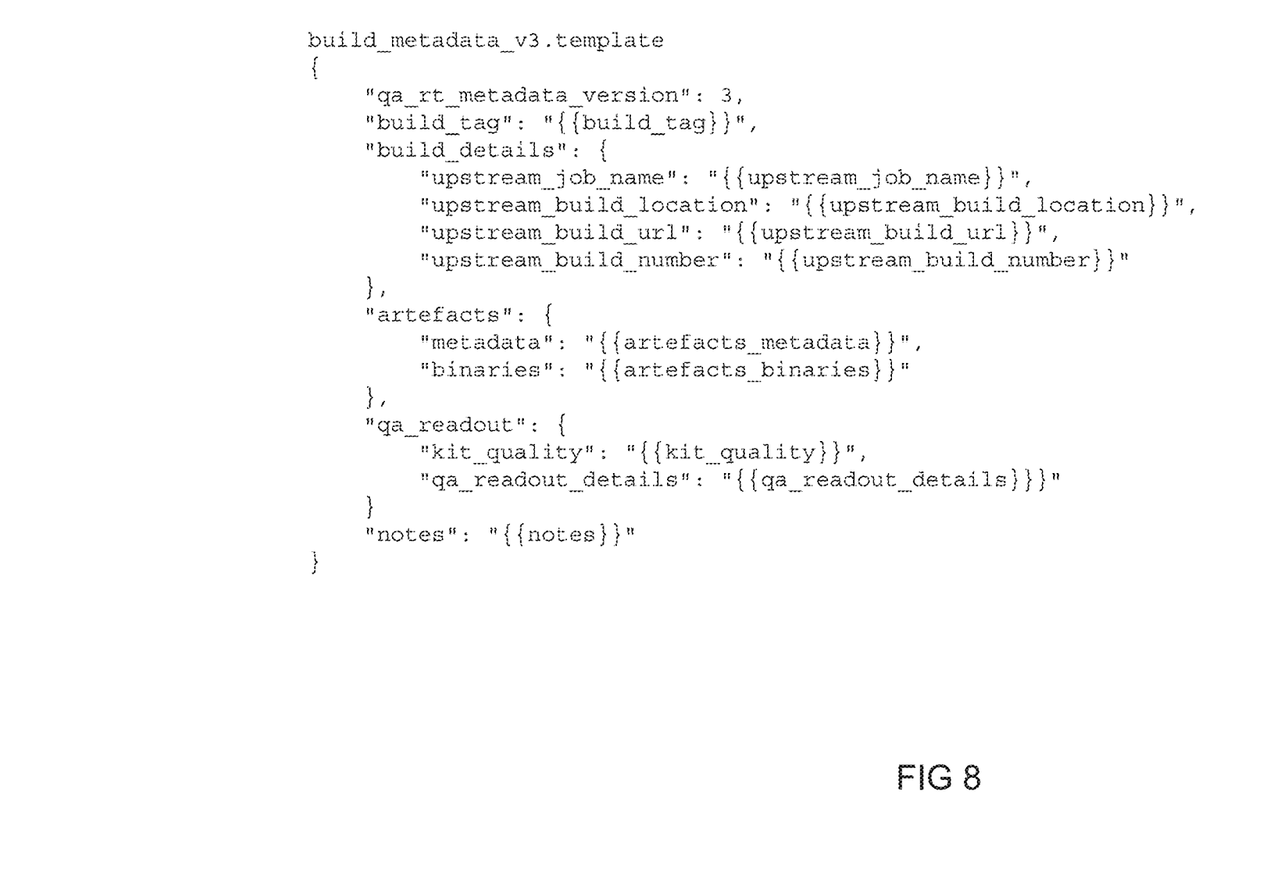
FIG. 8 schematically illustrates a template corresponding to the example manifest file of FIG. 6.

FIG. 6 is an example manifest file containing specific information about a software kit build version. The manifest file is a file containing metadata describing characteristics of the software kit. As shown in FIG. 8 in this example the manifest file comprises a build tag 610 for identifying the particular build version and for correlating test data, quality assurance data and bug data related to code components corresponding to the particular software kit. The manifest file may comprise a build details entry 620 specifying a build location and a uniform resource location (URL) associated with the build. In this example the build details also include a storage location of the executable code corresponding to the build on an HTTP website. The manifest file comprises a listing of artefacts 630 associated with the build version, which may include metadata and binary code corresponding to code components of the software build and location of a file server where an installer for the build version is stored. The installer is used to implement the testing pipeline stages according to the present technique. A quality assurance readout field 640 may be included which specifies a kit quality for containing input from quality assurance engineers or managers and this may comprise free text comments from human input received by a web-based interface of the CCDP 182. The manifest file of FIG. 6 is simply one example and the manifest file may be constructed, for example, using XML or Java or another suitable high-level programming language or markup language or some other structured syntax.

Figure 7:
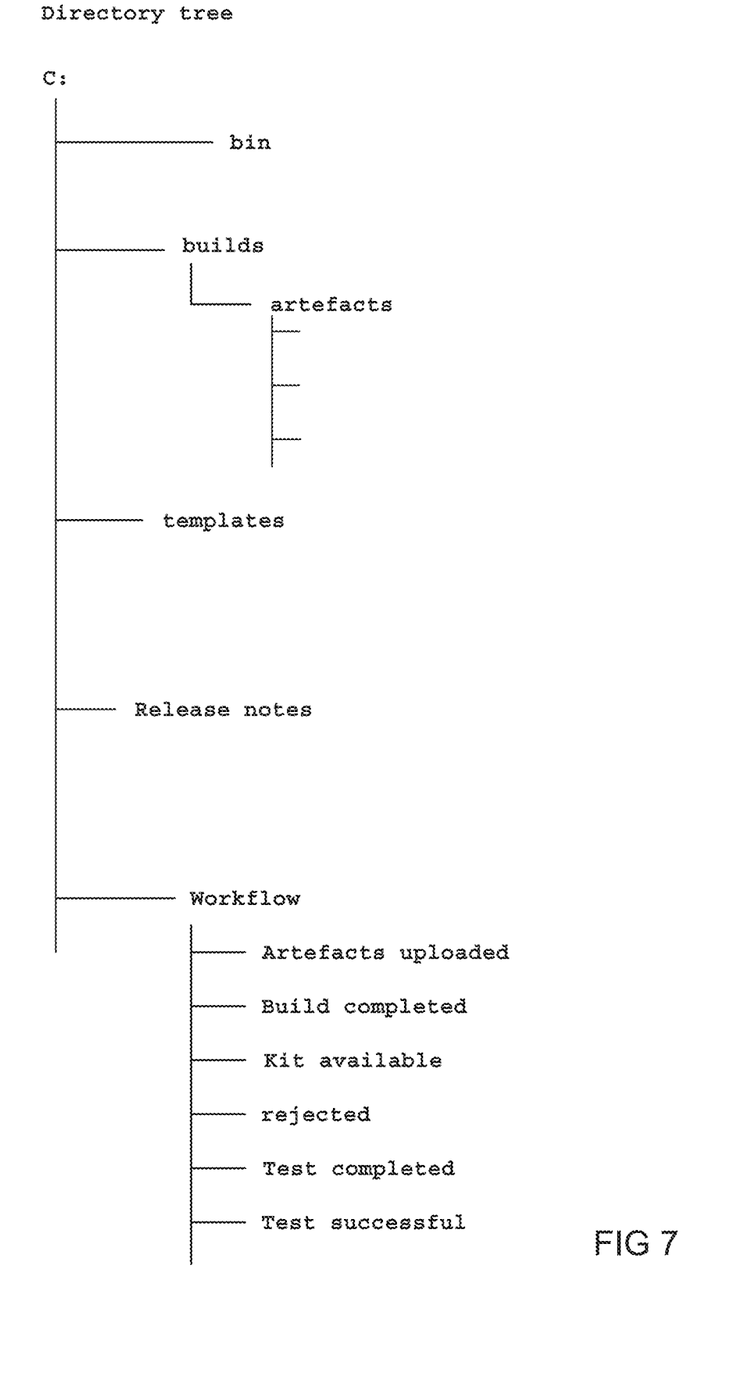
FIG. 7 schematically illustrates a software kit release hierarchy associated with the manifest file of the example of FIG. 6.

FIG. 7 schematically illustrates a directory tree in the version control program 410 (see FIG. 4) of information including code components that may be merged, that is approved for storage, into the CCDP code repository 120. The directory tree includes a pointer to a location of a repository where executable code or binary code corresponding to the build version of the software kit is stored. This executable code may be executed in response, for example, to a command of the CCDP 182. The executable code could be bytecode. The next level of the directory tree involves the build details including artefacts associated with the build. Examples of artefacts include executable code for the constituent code components, metadata related to the software kit and design documentation such as Universal Modelling Language (UML) files.

With regard to the executable code for the constituent code components, pointers to storage locations of the executable code may be included in the manifest file rather than the code itself. The next level of the directory tree involves templates that set out the format of the manifest file in FIG. 6. The attributes 610, 620, 630, 640 in the manifest file of FIG. 6 all have associated values. These values were stored as a result of automated population of the manifest file template. An example manifest file template is shown in FIG. 8. Comparison of the template file of FIG. 8 with the populated manifest file of FIG. 6 shows that the template defines a plurality of fields to be populated in a manifest file. For example a "build tag" field, a "build details" field and a "qa readout" field. Below the templates in the directory tree of FIG. 7 are release notes, which comprise free text entered by quality assurance managers and engineers relating to of the software kit. The directory tree at the lowest level in this example may also include a workflow comprising example workflow process elements including: (i) artefacts uploaded; (ii) build completed; (iii) kit available; (iv) kit rejected; (v) test completed and (vi) test successful.

The software kit release managing program 184 may be used to issue commands and to trigger actions that control automation of progression through a software kit build version release workflow. The manifest file can be used to track the software kit as it flows through the testing pipeline workflow and the manifest file may be updated with test results and quality assurance information as the workflow progresses. Thus the software kit release managing program according to the present technique monitors events generated by the CCDP 182 and triggers tests and causes workflow promotion events using custom commands of the CCDP 182 for processing of a software kit built version through a complete testing and release process. The software kit release managing program according to the present technique may not directly run the testing code of the testing pipeline, but can triggers a chain of events that invokes a system that executes the tests via interaction with the CCDP 182.

Processing circuitry or circuitry such as the manifest file generating circuitry 114, the manifest file adding circuitry and the pipeline progress automation circuitry 118 may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Program instructions may be provided on a non-transitory medium or via a transitory medium. The transitory medium may be a transmission medium.

Processing hardware may comprise, for example, one or more processors, servers, very large scale integration (VLSI) circuits or gate arrays, off-the-shelf semiconductors such as logic chips, transistors, or other discrete components. Processing hardware may comprise programmable hardware devices such as field programmable gate arrays, programmable array logic, programmable logic devices or the like. The processing hardware may comprise a storage medium readable by the processor, including volatile and non-volatile memory and/or storage elements. The processing hardware may also comprise at least one input device, and at least one output device. The volatile and non-volatile memory and/or storage elements may be a random access memory (RAM), erasable programmable read-only memory (EPROM), flash drive, optical drive, magnetic hard drive, or other medium for storing electronic data.

Code or machine-readable program instructions may be implemented in a high level procedural or object-oriented programming language. However, the code may be implemented in assembly or machine language, if desired. In any case, the language may be a compiled or interpreted language, and combined with hardware implementations.

The invention claimed is:

1. A non-transitory machine-readable storage medium encoded with a software kit release managing program executable by a processor, the non-transitory machine readable storage medium comprising:
   code to generate a manifest file corresponding to a build version of a software kit, wherein the build version comprises a set of executable code components of the software kit, and wherein an individual code component of the set of code components included in the software kit is updated while other code components of the set of code components are unchanged;
   code to add the manifest file to a code repository of a collaborative code development program;
   code to specify in the manifest file a pointer to a storage location of executable code of the build version of the software kit;
   code to automate progression of the build version of the software kit through a code testing pipeline having a plurality of pipeline stages using the collaborative code development program;
   code to generate a command of the collaborative code development program to initiate loading by the collaborative code development program, in response to receipt of the command, of the executable code of the software kit into the code repository by retrieving the executable code of the software kit from the storage location indicated by the pointer; and code to trigger execution by testing hardware of tests corresponding to one of the plurality of pipeline stages in response to receipt of a notification from the collaborative code development program that the executable code of the software kit has been received in the code repository.

2. The non-transitory machine-readable storage medium of claim 1, wherein the code to automate progression comprises at least one of: a command for entry to a command line of the collaborative code development program; a program instruction; a script; and a function.

3. The non-transitory machine-readable storage medium of claim 1, comprising code to update the manifest file or the code repository with results of tests corresponding to the at least one stage of the code testing pipeline.

4. The non-transitory machine-readable storage medium of any claim 1, comprising code to append a build tag characteristic of the build version of the software kit to the manifest file, wherein the build tag is used by the collaborative code development program to correlate output of the code testing pipeline with the manifest file for updating of the manifest file.

5. The non-transitory machine-readable storage medium of claim 1, comprising code to specify in the manifest file a location of the code repository of the collaborative code development program.

6. The non-transitory machine-readable storage medium of claim 1, wherein the progression automation code causes the build version of the software kit to progress between two successive stages of the code testing pipeline.

7. The non-transitory machine-readable storage medium of claim 1, comprising code to receive a notification from the collaborative code development program that the build version of the software kit has received approval in a given test pipeline stage of the code testing pipeline based upon information provided via an input device of the collaborative code development program by a quality assurance manager.

8. The non-transitory machine-readable storage medium of claim 7, comprising code to trigger an action in response to receipt of the approval notification of the build version of the software kit in the given test pipeline stage, the action comprising one of: generating a report corresponding to results of the given test pipeline stage; tagging source code corresponding to the approved build version of the software kit; electronically notifying one or more users of the software kit of the approval of the build version of the software kit.

9. The non-transitory machine-readable storage medium of claim 1, comprising code to define a template for contents of the manifest file specifying a plurality of manifest file attributes to be populated.

10. The non-transitory machine-readable storage medium of claim 1, wherein the code for generating the manifest file includes in the manifest file a list of artefacts corresponding to the build version of the software kit, the artefacts comprising at least one of: a pointer to at least a subset of the set of code components of the software kit; an installer location; code design requirements; Universal Modelling Language models; software libraries; archive files; and metadata corresponding to the software kit.

11. The non-transitory machine-readable storage medium of claim 1, comprising code to initiate uploading of the build version of the software kit to a content distribution mechanism depending upon successful completion of a final one of the plurality of pipeline stages.

12. A system for testing a release of a software kit using a code testing pipeline having a plurality of stages, the system comprising a collaborative code development manager and a software kit release pipeline manager, in which:
the software kit release pipeline manager has processing hardware to:
generate a manifest file corresponding to a build version of the software kit, wherein the build version comprises a set of executable code components of the software kit, and wherein an individual code component of the set of code components included in the software kit is updated while other code components of the set of code components are unchanged;
add the manifest file to a code repository of the collaborative code development manager;
specify in the manifest file a pointer to a storage location of executable code of the build version of the software kit;
automate passage of the build version of the software kit through the code testing pipeline using the collaborative code development manager;
generate a command of the collaborative code development manager to initiate loading by the collaborative code development manager the build version of the software kit into the code repository; and wherein
the collaborative code development manager has processing hardware to:
receive the build version of the software kit and store the received build version in the code repository in response to receipt of the command by retrieving the build version of the software kit from the storage location indicated by the pointer;
trigger execution by testing hardware of tests corresponding to one of the plurality of stages in response to receipt of the build version of the software kit;
receive via a computer interface, input from a quality assurance manager relating to approval of the build version of the software kit corresponding to a given stage of the code testing pipeline and notify the software kit release pipeline manager of a result of the approval input; and
store a manifest file corresponding to the build version of the software kit.

13. A method of automating progress of a software kit through a code testing pipeline having a plurality of pipeline stages using a collaborative code development program, the collaborative code development program having a code repository for storing a set of code components corresponding to the software kit, the method comprising:
generating a manifest file corresponding to a build version of the software kit, wherein the build version comprises a set of executable code components of the software kit, and wherein an individual code component of the set of code components included in the software kit is updated while other code components of the set of code components are unchanged;
adding the manifest file to the code repository of the collaborative code development program;
specifying in the manifest file a pointer to a storage location of executable code of the build version of the software kit;
automating passage of the build version of the software kit through the code testing pipeline using the collaborative code development program;
generating a command of the collaborative code development program to initiate loading by the collaborative code development program, in response to receipt of the command, of the executable code of the software kit into the code repository by retrieving the executable code of the software kit from the storage location indicated by the pointer; and triggering execution by testing hardware of tests corresponding to one of the plurality of pipeline stages in response to receipt of a notification from the collaborative code development program that the executable code of the software kit has been received in the code repository.

14. A data processing apparatus comprising processing hardware for automating progress of a software kit through a code testing pipeline having a plurality of pipeline stages using a collaborative code development program, the collaborative code development program having a code repository for storing a set of code components corresponding to the software kit, the processing hardware comprising:

circuitry to generate a manifest file corresponding to a build version of the software kit, wherein the build version comprises a set of executable code components of the software kit, and wherein an individual code component of the set of executable code components included in the software kit is updated while other code components of the set of executable code components are unchanged;

circuitry to add the manifest file to the code repository of the collaborative code development program;

circuitry to specify in the manifest file a pointer to a storage location of executable code of the build version of the software kit;

circuitry to automate passage of the build version of the software kit through the code testing pipeline using the collaborative code development program;

circuitry to generate a command of the collaborative code development program to initiate loading by the collaborative code development program, in response to receipt of the command, of the executable code of the software kit into the code repository by retrieving the executable code of the software kit from the storage location indicated by the pointer; and circuitry to trigger execution by testing hardware of tests corresponding to one of the plurality of pipeline stages in response to receipt of a notification from the collaborative code development program that the executable code of the software kit has been received in the code repository.

15. The method of claim 13, wherein said automating passage comprises employing one of: a command for entry to a command line of the collaborative code development program, a program instruction, a script, and a function.

16. The method of claim 13, wherein the collaborative code development program is repurposed to perform software kit release management and facilitates use by programmers and quality assurance engineers by leveraging command-line commands of the collaborative code development program.

17. The method of claim 13, further comprising tracking the software kit as it progresses through the plurality of pipeline stages by updating the manifest file with results of tests and quality assurance information for each of the plurality of pipeline stages.

* * * * *